United States Patent [19]

Bengtson

[11] 3,725,318

[45] Apr. 3, 1973

[54] PROCESS FOR THE MANUFACTURE OF POLYURETHANE FOAM BY CONTROLLING THE RATE OF HEAT GENERATION

[75] Inventor: Olle Bengtson, Goteborg, Sweden

[73] Assignee: Imperial Chemical Industries Limited, London, England

[22] Filed: Mar. 9, 1971

[21] Appl. No.: 122,339

[52] U.S. Cl. .....260/2.5 BD, 260/2.5 AE, 260/2.5 AF
[51] Int. Cl. .............................................C08g 22/44
[58] Field of Search .......260/2.5 AF, 2.5 AE, 2.5 BD

[56] References Cited

UNITED STATES PATENTS 3,108,976   10/1963   Knox......................................260/2.5
3,437,722   4/1969    Cronin et al........................260/2.5 X

FOREIGN PATENTS OR APPLICATIONS 707,381   4/1965   Canada ................................260/2.5

Primary Examiner—Donald Czaja
Assistant Examiner—M. J. Welsh
Attorney—Cushman, Darby & Cushman

[57] ABSTRACT

A process for the manufacture of a polyurethane foam which comprises forming a reaction mixture containing an organic polyisocyanate, an organic polyol and an inert blowing agent having a boiling point not exceeding 50°C. at atmospheric pressure under such a pressure that the blowing agent is substantially in condensed form and releasing the pressure on said reaction mixture whereby it expands to form a froth which subsequently cures to form a foam, the reaction mixture having been brought to such a temperature, either before or during the release of pressure, that the rate of generation of reaction heat in said froth during the curing period is substantially equal to the rate at which heat is dissipated from the froth to its surroundings.

5 Claims, 1 Drawing Figure

PATENTED APR 3 1973 3,725,318
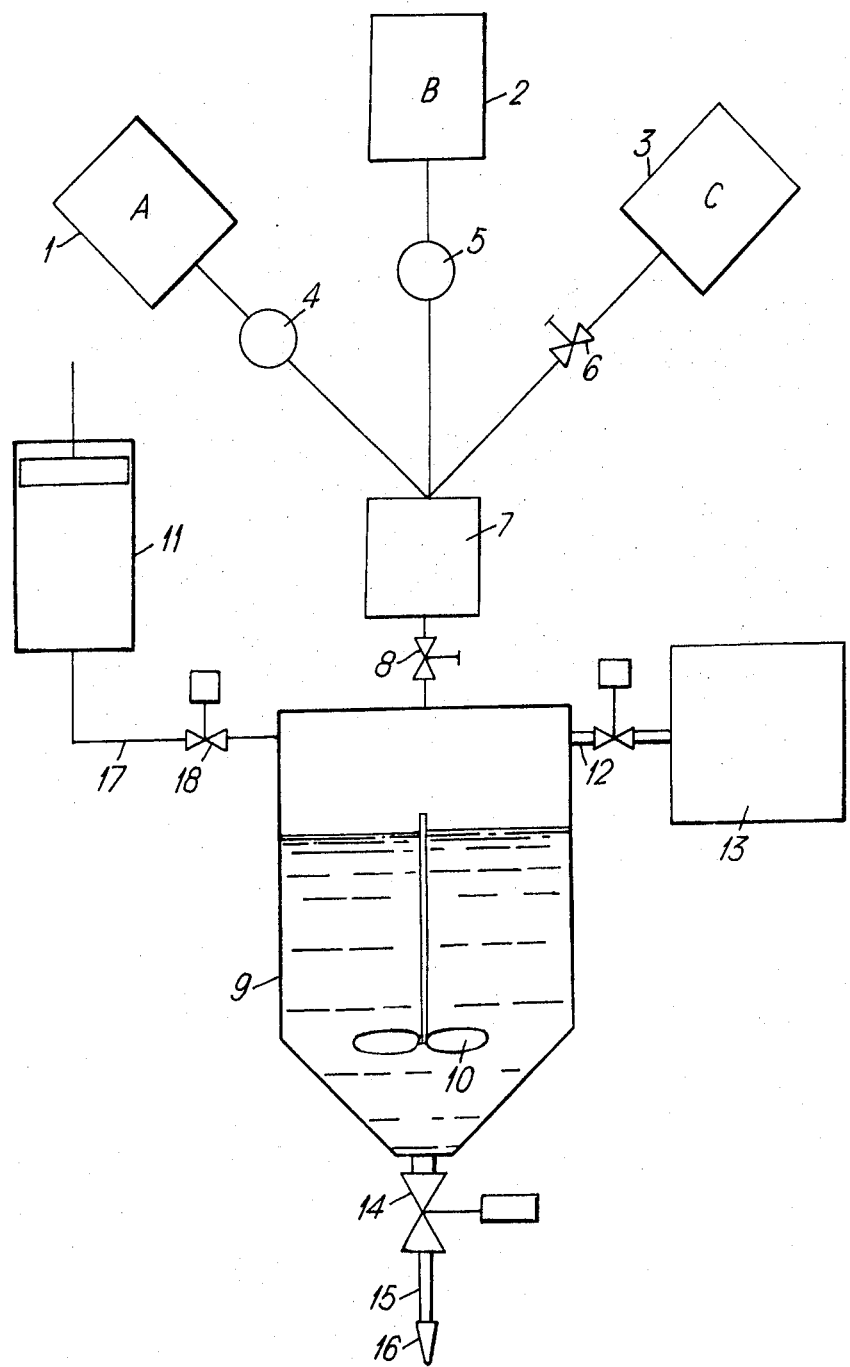
Inventor
OLLE BENGTSON
By
Cushman, Darby & Cushman
Attorneys

PROCESS FOR THE MANUFACTURE OF POLYURETHANE FOAM BY CONTROLLING THE RATE OF HEAT GENERATION

This invention relates to foamed plastics material and more particularly to a process for the manufacture of polyurethane foam.

It is already known to manufacture polyurethane foams by reacting an organic polyisocyanate with an organic polyol in the presence of a volatile liquid blowing agent which is caused to vaporize under the influence of the heat generated by the reaction between the polyisocyanate and the polyol. It is also known to use blowing agents which are normally gaseous but which are held in condensed form by maintaining the reaction mixture under pressure. In this latter case vaporization of the blowing agent occurs when the pressure is released, the reaction mixture then expanding rapidly to form a froth which subsequently cures to become a polyurethane foam. In both cases the reaction mixture continues to expand after the blowing agent has been vaporized because of the effect of the heat of reaction. This can cause considerable difficulties in certain situations because of the pressure exerted on its surroundings, for example mould walls, by the still expanding foam. This is particularly the case when a mixture having a rapid reaction rate is used.

In many situations it would be useful to produce a foam which during its plastic stage and before cure did not change in volume or changed very little so that the mould walls would be subjected to very low pressures. This is of considerable practical importance in the manufacture of, for example, refrigerators and freezers and especially in the manufacture of larger articles such as boats, caravans, structural members etc. where the cost of strong, heavy moulds capable of resisting high pressures constitutes a significant part of the total manufacturing cost.

The present invention obviates or minimizes the aforesaid difficulties associated with prior art processes.

According to the present invention there is provided a process for the manufacture of a polyurethane foam which comprises forming a reaction mixture containing an organic polyisocyanate, an organic polyol and an inert blowing agent having a boiling point not exceeding 50°C. at atmospheric pressure under such a pressure that the blowing agent is substantially in condensed form and releasing the pressure on said reaction mixture whereby it expands to form a froth which subsequently cures to form a foam, the reaction mixture having been brought to such a temperature, either before or during the release of pressure, that the rate of generation of reaction heat in said froth during the curing period is substantially equal to the rate at which heat is dissipated from the froth to its surroundings.

By adjusting the temperature of the reaction mixture appropriately it can be ensured that there is a balance of heat generation and heat loss during the curing period so that the froth cures without substantial change in volume thus exerting no undesirable pressure on its surroundings. Suitable temperatures can easily be found by trial. Factors to be taken into consideration include the reactivity of the components, the latent heat absorbed during vaporization of the blowing agent, the temperature of the surroundings, for example the mould into which the froth may be dispensed, and the thermal conductivity of the surroundings. The temperature of the reaction mixture may be adjusted by heating one or more of the components or, alternatively, the pressure on the reaction mixture may be released by passing it through a heated nozzle or other suitable heat exchange device.

The starting materials used in the process of the present invention may be those that have been fully described in the prior art relating to the manufacture of polyurethane foams.

Several polyisocyanates have been described in the prior art for use in polyurethane processes but naturally the most important ones are those that are commercially available in bulk quantities. One of these is tolylene diisocyanate which is available as the 2,4-isomer or as mixtures of the 2,4- and 2,6-isomers. Any of the available grades may be used in distilled or crude form. Also of importance are the crude diphenylmethane diisocyanate compositions, particularly those containing from 30 to 90 percent, preferably from 40 to 80 percent, by weight of diphenylmethane diisocyanates, the remainder being polymethylene polyphenyl polyisocyanates of functionality greater than two. Such compositions may be obtained by the phosgenation of crude diaminodiphenylmethane as has been fully described in the prior art.

Organic polyols suitable for use in the process of the invention include the polyols that have already been used or proposed to be used in the manufacture of polyurethane foams. In particular, there may be mentioned polyols prepared by the reaction of one or more alkylene oxides with a compound containing a plurality of active hydrogen atoms. Suitable alkylene oxides include ethylene oxide, epichlorohydrin, 1,2-propylene oxide, 1,2-butylene oxide, 2,3-butylene oxide and styrene oxide. Mixtures of two or more oxides may be used if desired, or, as a further variant, the active hydrogen-containing compound may be reacted with two or more alkylene oxides in successive stages, for example using propylene oxide in the first stage and ethylene oxide in the second or, conversely, ethylene oxide in the first stage and propylene oxide in the second. Compounds containing a plurality of active hydrogen atoms with which the alkylene oxides may be reacted include water, ammonia, hydrazine, cyanuric acid, phosphorous, phosphoric or phosphonic acids, polyhydroxy compounds, for example ethylene glycol, propylene glycol, diethylene glycol, glycerol, trimethylolpropane, triethanolamine, pentaerythritol, sorbitol, sucrose, phenolformaldehyde reaction products, resorcinol and phloroglucinol, aminoalcohols, for example ethylene diamine, hexamethylene diamine, tolylene diamines and diaminodiphenylmethanes and poly-carboxylic acids, for example adipic acid, terephthalic acid and trimesic acid. The conditions for the reaction between the alkylene oxide and the active hydrogen containing compound may be those fully described in the prior art using, for example, basic catalysts such as potassium hydroxide or acidic catalysts such as boron trifluoride. The reaction products may have molecular weights of between 300 and 8,000 according to the amount of alkylene oxide reacted with the active hydrogen-containing compound. Other suitable polyols are polyesters which may be made, for example, from polycarboxylic acids and polyhydric alcohols. Suitable polycarboxylic acids include succinic, glutaric, adipic, sebacic, phthalic, isophthalic, terephthalic and trimesic acids. Mixtures of acids may used. Examples of polyhydric alcohols include ethylene glycol, propylene glycol, tetramethylene glycol, diethylene glycol, decamethylene glycol, glycerol, trimethylolpropane and pentaerythritol. The polyesters may contain amide groups introduced by including a proportion of diamine or aminoalcohol in the polyester-forming reaction mixture. Suitable diamines and amino-alcohols include ethylene diamine, hexamethylene diamine, tolylene diamines and ethanolamines. The polyesters suitably have molecular weights between 300 and 6,000.

The blowing agent used in the process of the invention is a material which is inert towards the other ingredients of the system and has a boiling point not exceeding 50°C. at atmospheric pressure. Suitable inert blowing agents are those that have already been proposed for use in making polyurethane foams. Thus, mention may be made of halogenated hydrocarbons having boiling points not exceeding 50°C. at atmospheric pressure and particularly fluorinated hydrocarbons. Dichlorodifluoromethane in a particularly suitable blowing agent because of its low boiling point and may be used alone or in admixture with trichlorofluoromethane. When trichlorofluoromethane is used alone as the blowing agent it is necessary before or during release of the pressure to heat the foamable composition to a temperature above that at which the trichlorofluoromethane will boil. The amount of blowing agent used may be varied according to the foam density it is desired to achieve and may be from 10 to 100 percent or more based on the weight of polyol. The reaction mixtures used in the process of the invention may also contain other conventional ingredients of polyurethane foam formulations. Thus, they may contain conventional catalysts, surfactants and fire retardants. Suitable catalysts may be of the tertiary amine or organic metal compound type but when catalysts are used in the process of the invention it must be ensured that their concentration is not so high as to cause a very rapid generation of heat. Suitable surfactants, which include organosilicon polymers, serve to stabilize the foam until cure has taken place. The usual fire retardants include tris chloroethyl phosphate and trischloropropyl phosphate.

In order that the invention may be clearly understood, an example thereof is illustrated in the accompanying drawing which is a diagrammatic sketch of equipment which may be used in the process of the invention.

The previously prepared components, A, B and C of the foam mixture, where A is a polyol, B a polyisocyanate and C a blowing agent, for example difluorodichloromethane, are placed in containers 1, 2 and 3, of which at least the last-mentioned is a pressure vessel, in which the blowing agent C is stored under pressure in liquid form. It is also possible to mix the blowing agent with any one of the two components A and B, in which case containers 1 and/or 2 must be pressure vessels. Through pumping or metering devices 4, 5 and 6 specific amounts of components A, B and C can be conveyed to a mixing zone 7, from which the mixed composition, which is continuously under pressure and in liquid form, is transferred through valve 8 to a pressure vessel 9, in which is a mixer 10 and, in the upper part of the vessel, on the one hand a pipe connection to a gas cylinder 11 and on the other hand an inflow pipe 12 from a container 13 containing for example glass fiber for reinforcement of the plastic foam. From the lower part of vessel 9 there issues a conveyor pipe 15 fitted with a stop valve 14, and at the open end of this pipe there is mounted a nozzle 16. The preparation of foam in accordance with the invention can be carried out in various ways depending upon what starting materials are used and what type of equipment is available. Thus it is possible to preheat the components separately in the respective containers or to bring the prepared composition in vessel 9 to the correct temperature. This temperature is dependent upon the temperature obtaining where the froth finds itself after extrusion through nozzle 16, and which may be a mould, a space in a house wall, a planar surface or the like. If the extrusion is carried out when, for example, the mould walls have a temperature of about +40°C., the composition is heated, for example, to +70°C., and the pressure in vessel 9 must be so great that the blowing agent does not boil. After an optional admixture of glass fiber reinforcement or the like from container 13, valve 14 is opened so that the composition can pass out through pipe 15 and nozzle 16. As the result of the immediate fall in pressure as the composition issues from the nozzle, the blowing agent instantly vaporizes and a froth is formed. The cooling caused by the rapid vaporization of the blowing agent is compensated for beforehand by a corresponding raising of the temperature of the composition in vessel 9. The froth issuing from nozzle 16 has a temperature of about +40°C. and on coming into contact with the mould, heat is dissipated, so that very soon after the extrusion a balance prevails between the generation of heat by the foam, conditioned by the reaction of the components between themselves, and the dissipation of heat to the surroundings, i.e., the mould or the atmosphere, per unit time.

The temperature difference between the froth formed and the surroundings will thus be as small as possible and ideally will be zero, so that during the curing period the blowing agent is enclosed in the closed cells of the foam and the foam thereby retains its blown volume until it cures. Depending upon the purpose for which the foam is to be used, the course of the reaction process can be determined beforehand and will take a longer or a shorter time. In the production of large foamed plastic articles a relatively long reaction time is chosen so that the generation of heat by the reaction will remain at a low level and can readily be controlled.

To prevent boiling of the blowing agent during partial discharge of the composition from vessel 9, caused by the resulting fall in pressure, to this vessel there is attached, through pipe 17 and valve 18, the above-mentioned gas cylinder 11, which, in proportion as the discharge proceeds, provides the vessel with gaseous blowing agent, so that the necessary pressure of, for example, 6 atm gauge is maintained. During the charging of vessel 9 the gas cylinder 11 can be used to monitor the amount of gas remaining in vessel 9.

To further reduce the generation of heat during foam formation, the polyol and polyisocyanate can be caused to pre-react with each other, for example by the preparation of "quasi"-prepolymers having isocyanate end groups or hydroxyl end groups or by the use of components with a low content of reactive groups per unit weight. One may also add substances which retard the reaction and hence the generation of heat per unit time and use sterically hindered isocyanate groups in the isocyanate, aliphatic isocyanates, polyols with secondary hydroxyl groups etc.

The heating of the composition may of course be effected at a different stage of its assembly from that described above, for example in conjunction with the passage through the nozzle, which for this purpose is heated.

The process according to the invention is also suitable for the manufacture of foamed plastic articles with a densified surface layer, the method being especially suitable for items of complicated shape such as car bodies or parts thereof, leisure boats, caravans, house sections and so on. This densified surface layer, which can be given a high finish, is produced by introducing the froth into a mould, in which it first wets out and fills up the mould, so that the air is displaced, after which the mould is closed and further froth is introduced, whereby the surface layer is densified. Since the main part of the reaction between the components may extend over a relatively long period of time of anything up to 1 hour, the densification of the surface layer — that is to say, the introduction of a further amount of froth into the mould — is done slowly, so that no appreciable increase in pressure in the mould will occur. The relatively low blowing pressure means that the mould costs remain very reasonable even for relatively short production series.

The foam produced in accordance with the invention may be rigid, semi-rigid or flexible depending upon the starting materials used. Thus, rigid foams are usually produced from polyols having from 3 to 8 hydroxyl groups and hydroxyl numbers of from 400 to 600. Flexible foam polyols generally have 2 or 3 hydroxyl groups and hydroxyl numbers of from 30 to 80, preferably 40 to 70. Intermediate polyols give semi-rigid foams.

The invention is further illustrated but not limited by the following Example in which all parts are by weight.

EXAMPLE

The following materials are mixed together and heated to 70°C. in a vessel under pressure.

| | |
|---|---|
| Oxypropylated glycerol (molecular weight 600) | 60 parts |
| Crude diphenylmethane diisocyanate | 150 parts |
| Tris-2-chloroethyl phosphate | 30 parts |
| Siloxane-oxyalkylene copolymer | 5 parts |
| Trichlorofluoromethane | 60 parts |

In a separate vessel a further quantity of the oxypropylated glycerol is heated to 70°C. and the two components are then metered to a mixing head in a ratio of 2 parts of above mixture to 1 part polyether. The components are then mixed under a pressure sufficient to prevent boiling of the trichlorofluoromethane before being released through a let-down valve. The resultant froth is at about 35°C. and is introduced into a metal plate mould at 35°C. until all air has been displaced from the mould. The mould exit is then closed and an equal quantity of froth is added. This gives very little increase in pressure because of condensation of the blowing agent at the mould surface giving a rigid foam having a smooth, dense, integral skin. The reaction rate is slow and accordingly no pressure build up is caused by the slow generation of reaction heat.

The crude diphenylmethane diisocyanate used in this Example has an isocyanate group content of 29.2 percent and contains approximately 55 percent of diisocyanatodiphenylmethane isomers, the remainder being polymethylene polyphenyl polyisocyanates of functionality greater than two.

What we claim is:

1. A process for the manufacture of a polyurethane foam which comprises forming a reaction mixture containing an organic polyisocyanate, an organic polyol and an inert blowing agent having a boiling point not exceeding 50°C at atmospheric pressure in a zone under elevated pressure, maintaining said resulting reaction mixture in said zone under a sufficiently elevated pressure so that said blowing agent remains substantially in liquid form, heating said reaction mixture in said zone under pressure, discharging said heated reaction mixture from said zone at elevated pressure to a zone at a lower pressure whereby said blowing agent vaporizes thereby producing a froth and curing the resulting foam, said reaction mixture in said zone at elevated pressure being heated to a temperature sufficiently elevated so that on discharge of the reaction mixture from the zone of elevated pressure to the zone of lower pressure the rate of generation of heat in said froth is substantially equal to the rate at which heat is dissipated from the froth to its surroundings in said lower pressure zone so that the temperature difference between the froth formed and said surroundings is sufficiently small whereby the blowing agent is enclosed in the closed cells of the foam and the said foam retains its blown volume until it cures.

2. A process as claimed in claim 1 wherein the polyisocyanate is tolylene diisocyanate or crude diphenylmethane diisocyanate.

3. A process as claimed in claim 1 wherein the blowing agent is dichlorodifluoromethane or trichlorofluoromethane or a mixture thereof.

4. A process as claimed in claim 1 wherein the polyisocyanate and polyol are allowed to react together to some extent to form a quasi-prepolymer before the pressure on the reaction mixture is released.

5. A process as claimed in claim 1 wherein the froth is formed in a mould so as to fill the said mould after which the mould outlet is closed and a further quantity of froth is introduced so as to produce a foam having a dense integral skin.

* * * * *